United States Patent

[11] 3,581,713

[72] Inventor Gordon Knighton Crooks
15 Wheeler Ave., Eastwood,
Nottinghamshire, England
[21] Appl. No. 799,730
[22] Filed Feb. 17, 1969
[45] Patented June 1, 1971
[32] Priority Nov. 19, 1968
[33] Great Britain
[31] 54736/68

[54] FEEDING VALVES INTENDED FOR ANIMALS TO DRAW LIQUID THROUGH FROM A SUPPLY
4 Claims, 3 Drawing Figs.
[52] U.S. Cl. .................................................. 119/72.5
[51] Int. Cl. .................................................. A01k 07/00
[50] Field of Search ........................................ 119/72.5, 75

[56] References Cited
UNITED STATES PATENTS
2,710,594 6/1955 Thompson .................. 119/72.5
2,939,424 6/1960 Frederiksen ................. 119/72.5
3,228,377 1/1966 Grassano ..................... 119/72.5
3,289,635 12/1966 Eagles ......................... 119/72.5

Primary Examiner—Hugh R. Chamblee
Attorney—George B. White

ABSTRACT: An animal feeding valve through which an animal (e.g. in a cage) can draw liquid from a supply to which the valve is connected, comprises a valve head disposed at the supply side of a valve seat and biassed against the seat by a spring at said supply side, a valve stem on the valve head extending through the seat, and an outlet cylinder surrounding the stem, the end of the valve stem being exposed at the end of the cylinder so that when an animal applies its mouth to the latter it can move the end of the stem sideways to open the valve; the extent of the sideways movement is regulated by an annular member which is mounted within the cylinder for axial adjustment therealong and through which the stem extends.

3,581,713

FEEDING VALVES INTENDED FOR ANIMALS TO DRAW LIQUID THROUGH FROM A SUPPLY

CROSS-REFERENCES TO RELATED APPLICATIONS

British Pat. application No. 54736/68 of Dec. 19th 1968, G. K. Crooks, from which priority is claimed.

BACKGROUND OF THE INVENTION

The present invention concerns improvements in feeding valves intended for animals to draw liquid from a supply, the term feeding being used to include watering.

It is the object of this invention to provide a valve which may reduce the risk of disease microbes being carried back to the supply from an animal, so as to transmit a disease to another animal.

Previous valves have been proposed which are such that the pressure is reduced for various kinds of animals to be fed, though the maximum opening of the valve member is always kept constant, thus introducing the possibility of bacteria passing back through into the feeding supply and thus contaminating other animals fed from the same supply, in other cages.

Previous devices for similar purposes could not be adjusted to determine the rate of flow according to the size of the animal.

Preferably a filter is provided on the inlet side of the valve.

Preferably said means comprises a spring extending between the valve member and a shoulder on the interior of the valve housing.

SUMMARY OF THE INVENTION

According to the present invention there is provided a feeding valve comprising a body incorporating a liquid inlet port and a liquid outlet spout, a valve closure member biased towards the spout against a valve seat so as to close the spout from the inlet port, an arm extending through the spout and fixed to the valve closure member so that angular movement of the arm tilts the valve closure member relative to the seat to open the valve, and a control member defining an annular wall around the arm and spaced therefrom so as to limit angular movement of the arm, the control member being adjustable in position along the interior of the spout.

The position of the control member therefore determines the extent to which the valve closure member can be tilted relative to the seat and accordingly determines the maximum rate of flow of liquid from the inlet to the spout. In use, an animal operates the valve by angularly moving the arm with its tongue and the rate of flow is determined according to the size of the animal. The valve according to the invention permits regulation of the rate of flow without any necessity to regulate liquid supply pressure so that sufficiently high supply pressure can be used to insure that microbes cannot migrate to the inlet side of the valve through the liquid.

BRIEF DESCRIPTION OF THE FIGURES.

FIG. 2 is a cross section of FIG. 1, while

DETAILED DESCRIPTION

Figure 1:
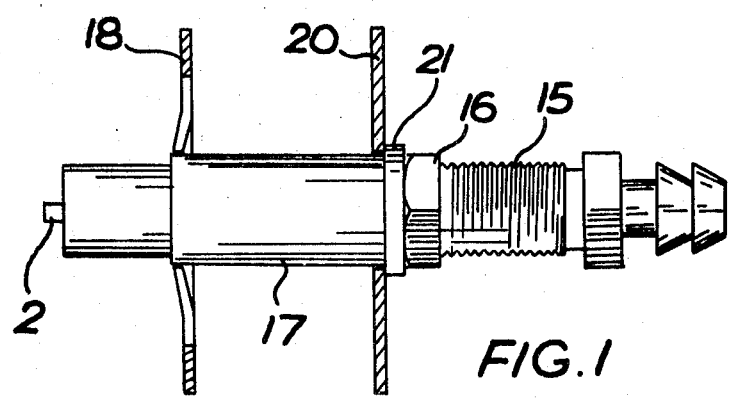
FIG. 1 shows a feeding valve intended for animals to draw liquid through from a supply.
Figure 2:
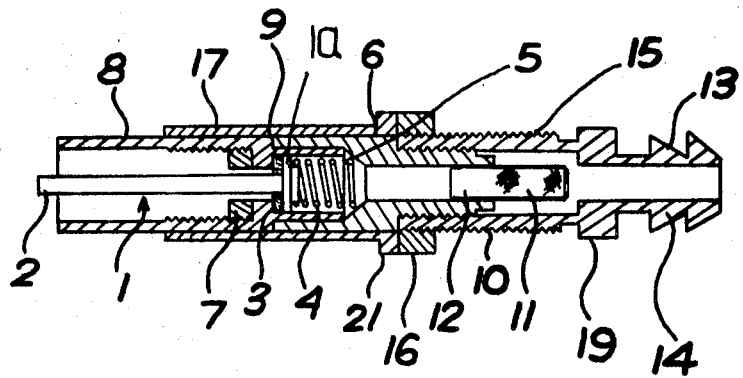

Referring to FIGS. 1 and 2, the feeding valve comprises a sleeve in the form of a mounting cylinder 17 having an outwardly directed end flange 21, the cylinder being shown received by a plain washer 20 in abutment with the flange and by a spring-finger washer 18 slideable along the cylinder for cooperation with the plain washer so as to mount the cylinder in an aperture in a cage wall.

The valve includes a body having a two-part valve housing comprising a first part 8 secured in mating engagement at 9 with a second part 6 so as to define a valve chamber between the parts. In the valve chamber, the first part defines a valve seat 3. The two parts of the housing define a continuous cylindrical outer surface slideably received in the mounting cylinder 17, the portion of the first part 8 between the seat 3 and the end of the first part remote from the second part defining an outlet spout.

The second part 6 screw engages with an inlet part 10 having an inlet nozzle 13 communicating with the valve chamber and defining an inlet port. The nozzle has sheds 14 for engaging in a supply hose (not shown). The inlet part 10 is externally screw threaded at 15 and has a shoulder 19 permitting consolidation of the inlet part with a cage wall or clip by means of a nut 16 engaged with the inlet part. The valve body may either be mounted in this manner or may be just slideably received in the mounting cylinder 17 for easy removal with the nut 16 defining a stop in abutment with the mounting cylinder 14.

A filter 11 is mounted in the first housing part 6 between the nozzle 13 and the valve chamber.

A valve closure member 1 is received in the valve chamber and urged against the seat 3, in the direction of the outlet spout, by a spring 4 seating against a shoulder 5 defined by the second housing part 6. An arm 2 extends coaxially from the member 1 within the valve seat 3 and through the outlet spout of the housing part 8.

An annular control member 7 has screw engagement with the interior of the spout so as to encircle the arm 2 with a clearance between the arm and the control member. The control member 7 can be adjustably positioned longitudinally of the spout to vary the spacing of the control member from the valve closure member.

OPERATION

In operation, the nozzle 13 is connected to a hose (or metal tubing if the nozzle is externally screw threaded) from a liquid supply line and liquid is admitted via the filter 11 to the inlet side of the valve closure member 2. When an animal desires liquid it angularly moves the arm 2 (which protrudes slightly beyond the end of the spout of the housing part 8) to one side with its tongue or teeth, thereby tilting the valve closure member 1 on the valve seat 3, the limit of tilting movement of the member 1 being determined by abutment of the arm 2 with the control member 7. The position of member 7 is adjustable to vary the degree of opening of the valve according to the size of the animals to be fed or watered. Clearly the larger the animal to be fed, the nearer is the control member 7 positioned to the valve seat 3. Additional opening movement of the valve closure member may be possible by levering the arm 2 on the control member 7 where there is clearance between the valve member and the surrounding part to permit such movement.

The provision of the spring 4 on the inlet side of the valve insures that an animal, such as a rat cannot gain access to the spring as the valve seat and annular member prevent such access. Rats have been known to gnaw at the spring of the previously known valve and thus open the valve permanently, causing the rats to be drowned in their cages.

Further, the provision of the control member 7 enables high supply pressure to be used even for small animals so as to avoid migration of bacteria back through the supply liquid. Previous valves have been proposed which are such that the pressure is varied according to the size of the animal to be fed or watered and the maximum permitted opening of the valve member is not varied. Hence microbes may be able to pass through the supply when the pressure is low so that other animals fed or watered from the same, supply, may pick up disease from the supply.

Figure 3:
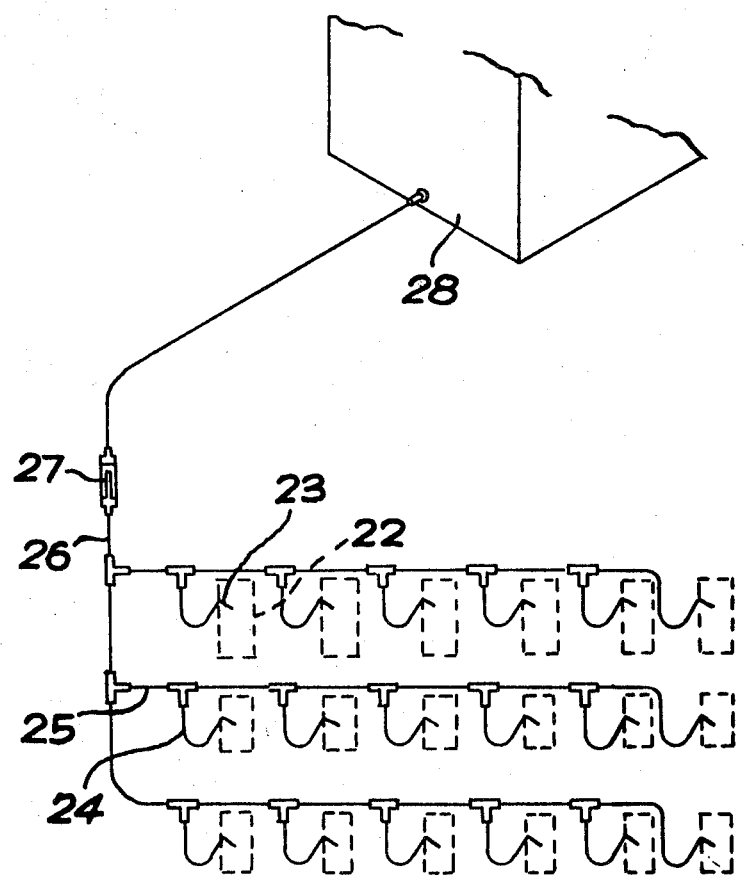
FIG. 3 is a diagram showing a watering apparatus incorporating a plurality of valves according to this invention.

In FIG. 3, there is illustrated a watering system incorporating a plurality of animal cages 22 each of which has a valve 23 as described above fixed to one of its walls (which may be of netting) to protrude into the cage interior. The several valves are connected by supply pipes 24 to branch lines 25 leading from a main supply pipe 26 supplied, by way of a filter unit 27, from a supply tank 28.

I claim:

1. In an animal feeding valve comprising a body, a liquid inlet port and a liquid outlet spout defined by the body, a valve seat in the body between the liquid inlet port and the liquid outlet spout, a valve closure member biased towards the spout against the valve seat so as to close the spout from the inlet port and an arm extending through the spout and fixed to the valve closure member so that angular movement of the arm tilts the valve closure member relative to the seat to open the valve, the improvement of:

a control member mounted in the spout for adjustment therealong, an annular wall being defined around the arm by the control member and serving variably to limit angular movement of the arm, according to the adjustment position of the control member in the spout.

2. An animal feeding valve according to claim 1, wherein the control member is screw engaged within the spout to permit said adjustment.

3. An animal feeding valve according to claim 1, including a shoulder in the body, and a spring acting on the shoulder and the inlet side of the valve closure member so as to bias the latter against the valve seat.

4. An animal feeding valve according to claim 1 including a filter positioned between the inlet port and the valve closure member.